United States Patent [19]

Vautier

[11] 4,251,722
[45] Feb. 17, 1981

[54] PULSE GENERATOR

[75] Inventor: Remi Vautier, Nice, France

[73] Assignee: International Business Machines Corporation, Armonk, N.Y.

[21] Appl. No.: 71,440

[22] Filed: Aug. 31, 1979

[51] Int. Cl.³ .......................................... H03K 21/36
[52] U.S. Cl. ........................ 235/92 DM; 235/92 CC; 235/92 PL; 328/38
[58] Field of Search ....... 235/92 CC, 92 DM, 92 PL, 235/92 PE; 328/38; 307/225 R

[56] References Cited

U.S. PATENT DOCUMENTS

| | | | |
|---|---|---|---|
| 3,714,393 | 1/1973 | Johnson et al. | 235/92 DM |
| 3,832,640 | 8/1974 | Cederquist et al. | 328/38 |
| 3,840,724 | 10/1974 | Tripp | 235/92 DM |
| 4,086,471 | 4/1978 | Takahashi | 235/92 CC |

*Primary Examiner*—Joseph M. Thesz
*Attorney, Agent, or Firm*—John W. Girvin, Jr.

[57] ABSTRACT

A pulse generating device for speeding-up the rate of a pulse train from N to N+n wherein each of the pulses in the N+n pulse train is synchronized with the immediately preceding pulse in the original N pulse train. A count-up counter is reset upon each original pulse and counts up from zero, at frequency F/N+n, up to the following original pulse. A count-down counter is loaded with the contents of the count-up counter when the following original pulse occurs or when the output pulses occur with the exception of the last pulse in the interval when the time interval between said original pulses includes several generated output pulses, and is decremented at frequency F/M up to zero. A variable presettable counter provides the count-down counter with frequency F/M when each original pulse appears or when the output pulses appear with the exception of the last pulse in the interval when the time interval between the original pulses includes several output pulses. A control memory supplies values M to the variable counter in response to the original pulses or to the output pulses with the exception of the last pulse in the time interval between two original pulses. The output pulses are produced each time the count-down counter reaches value zero.

5 Claims, 2 Drawing Figures

PULSE GENERATOR

DESCRIPTION

BACKGROUND OF THE INVENTION

This invention concerns pulse generators and, more particularly, a device for speeding-up the rate of a pulse train from N to N+n pulses, wherein each of the pulses in the N+n pulse train is synchronized with the immediately preceding pulse in the original N-pulse train.

DESCRIPTION OF THE PRIOR ART

In those devices which involves an operation at regular intervals, it is often useful to speed-up the rate or the repetition frequency of this operation. Such is the case, for instance, in a step-by-step control motor, a printer and, generally, in any control devices which control intermittent movements at a given frequency.

By way of an example, in the wire-type printers, the characters are formed of a number of columns of points typed through the impact of a printing head having a column of wires, wherein the impact movement of each wire is controlled according to the character to be printed. Thus, the printing head can assume a printing position upon each relative feeding movement of the paper upon which the characters are printed, which is equal to 0.254 mm (1/100 of an inch). Since, when printing a character, allowing for the character space, 10 impacts are necessary for each character, such a printer makes it possible to obtain a printing density of 10 characters for each 25.4 mm (i.e. 10 characters per inch). The printing head is controlled by activating selected wires upon each relative feeding of the print sheet, which is equal to 0.254 mm, by means of control pulses which occur at a predetermined rate which is a function of the speed of this movement.

Now, if it is desirable to obtain a printing density of 12 characters for each 25.4 mm, it is necessary to either modify the printer control device, or generate a pulse train at a rate which is equal to 12/10 the rate of the control pulses of the non-modified printer. As, in some printers, the control device for controlling the impact pulses of the printing head is a printed circuit board, it is preferred to make use of the second solution which consists in generating a new pulse train from the first one. But, in that case, there is the problem relative to how to synchronize the generated pulses with the original pulses. Indeed, the original pulses are normally regularly time-spaced, i.e., the time interval between two original pulses is theoretically equal to a well-defined value T. Actually, this does not always hold true, and the time interval between two consecutive original pulses may happen to vary in the course of time. That is why the synchronization of the output pulses with the original pulses must constantly be kept in the course of the time.

SUMMARY OF THE INVENTION

In order to solve this problem, this invention provides a device for obtaining N+n output pulse trains from N original pulse trains, each of the output pulses being synchronized with the immediately preceding original pulse, the first pulse in the N+n output pulses being coincident with the first original pulse.

The device according to this invention consists of a count-up counter which is reset upon each original pulse and which counts up from zero, at frequency $\frac{F}{N+n}$, up to the following original pulse, a count-down counter loaded with the contents of said count-up counter when this following original pulse occurs or when the output pulses occur with the exception of the last pulse in the interval when the time interval between said original pulses includes several generated output pulses, and is decremented at frequency F/M up to zero; a variable presettable counter providing the count-down counter with frequency F/M when each original pulse appears or when the output pulses appear with the exception of the last pulse in the interval when the time interval between the original pulses includes several output pulses; and a control memory which supplies values M to the variable counter in response to the original pulses or to the output pulses with the exception of the last pulse in the time interval between two original pulses; and the output pulses being produced each time the count-down counter reaches a value of zero.

This invention will be further explained, by way of a preferred embodiment, with reference to the accompanying drawings.

IN THE DRAWINGS

FIG. 1 is a schematic diagram of a device for speeding up the rate of a pulse train according to this invention.

DETAILED DESCRIPTION

Figure 4:
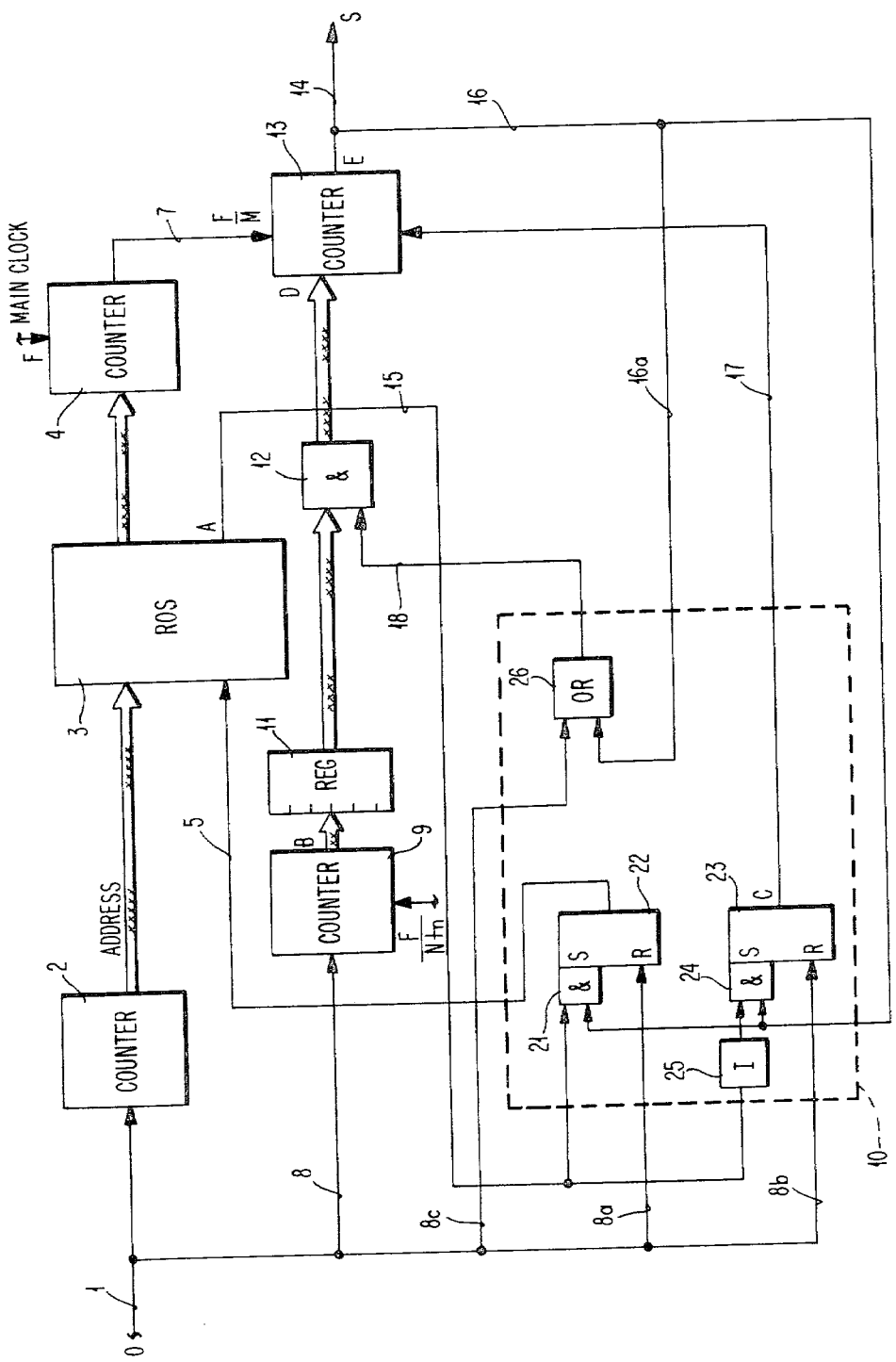

Referring now to FIG. 1 of the drawings, a schematic diagram of a device for speeding up the rate of a pulse train is depicted.

The original pulse train, which pulses will be designated by 0 in the following description, is received on line 1. Pulses 0 increment the original pulse counter 2. Counter 2 is used as an address register for a read-only storage ROS 3 which provides a number M to the variable preset counter 4, upon each incrementation of counter 2. Indeed, the address supplied to storage 3 is formed of the contents of counter 2 and of the bit supplied by logic unit 10, over line 5. Most of the time, this bit is equal to "0" and assumes value "1" only in specific cases, such as disclosed further on. Each time storage ROS 3 is addressed by counter 2, a number M, which will be defined in the following description, is supplied to variable counter 4. Counter 4 is incremented upon each pulse of a main clock of frequency F and supplies output pulses on line 7, at frequency F/M. It should be noted that counter 4 is a variable presettable-type counter, disclosed under reference TEXAS SN 74163 in the handbook published by Texas Instrument under the title "The Integrated Circuit Catalog for Design Engineers".

The purpose of this invention is to obtain regularly time spaced output pulses S from regularly time-spaced input pulses 0, pulses which are such that, from an N input pulse train, there are obtained N+n output pulses (N and n being integers), the first pulse in the output pulses being coincident with the first input pulse. To this end, the input pulses 0 are supplied, through line 8, to counter 9 which is constantly incremented under the control of a clock which supplies pulses at frequency Each time a pulse 0 is supplied to the input of counter 9, through line 8, this counter is reset to zero, which has for a result that, between two original pulses, which are assumed to be T time-spaced, counter 9 is incremented from 0 to $$\frac{T}{\frac{T}{F}-n}$$

The contents of counter 9 are loaded in register 11, the contents of which are sent through AND circuit 12, to counter 13, which is decremented at frequency F/M which is the frequency of the pulses received on line 7. Counter 13 is a borrow count-down type counter disclosed under reference Texas SN 74191 in the handbook published by Texas Instrument under the title: "The Integrated Circuit Catalog for Design Engineers". AND circuit 12, which is used to load counter 13 with the contents of register 11, is conducting upon each original pulse. Thus, upon each original pulse $0_n$, counter 13 is loaded with the contents of counter 9 which is obtained between pulses $0_{n-1}$ and $0_n$, i.e., at pulse frequency $$\frac{T}{\frac{T}{F}-n}$$

Thereafter, counter 13 is decremented at frequency F/M, from value $$\frac{T}{\frac{T}{F}-n} \text{ to 0.}$$

When it reaches value 0, i.e., after a timelength equal to $$\frac{t}{\frac{T}{F}-n} T,$$

counter 13 produces a pulse at the output 14.

As it will be shown further on, the pulses produced on line 14 are output pulses S. Indeed, when assuming that there is only one output pulse in the time interval between two original pulses, and that pulses $O_o$ is the first pulse in the original pulse train that is coincident with the output pulse $S_0$, pulse $S_1$ would be produced a time $$\frac{T}{\frac{T}{F}-n}$$

after pulse $O_o$. Likewise, pulse $S_2$ would be produced a time $$\frac{-n}{\frac{T}{F}+n} T$$

after pulse $O_1$, pulse $S_3$ would be a time $$\frac{N-2n}{N+n} T$$

after pulse $O_2$, and so on. Then, the storage ROS 3 is programmed so that, when pulse $O_i$ has incremented counter 2 to value i, address i corresponds to a value M equal N-in. Consequently, from the first original pulse $O_o$ (i=0), the frequency supplied by variable counter 4 to counter 13, through line 7, is F/N, which has for a result that counter 13 reaches O and produces a pulse a time $$\frac{N}{N+n} T$$

after pulse $O_o$. Likewise, counter 13 supplies the following pulse (i=1) a time $$\frac{N-n}{N+n} T$$

after pulse $O_1$, the pulse corresponding to i=2 a time $$\frac{N-2n}{N+n} T$$

after pulse $O_2$, etc. Under those circumstances, the (carry) pulses produced by counter 13 are desired pulses S.

When n=1, N+1 output pulse train corresponds to N input pulse train. In that case, the output pulse $S_0$ is coincident with pulse $O_o$, the output pulse $S_1$ is produced a time $$\frac{N}{N+1} T$$

after pulse $O_o$, pulse $S_2$ is produced a time $$\frac{N-1}{N+1} T$$

after pulse $O_1$, . . . the output pulse $S_{i+1}$ is produced a time $$\frac{N-i}{N+1} T$$

after pulse $O_i$, . . . pulse $S_N$ is produced a time $$\frac{N-(N-1)}{N+1} T = \frac{T}{N+1}$$

after pulse $O_{N-1}$, and the output pulse $S_{N+1}$ is coincident with pulse $O_N$.

On the other hand, when 1<n<N, there is at least one time interval between two original pulses within which two output pulses occur. In reference to FIG. 1, it can be observed that storage ROS 3 includes an output line 15 belonging to the output bit lines of storage ROS 3 which produces a bit each time it is addressed. Normally, the bit on line 15 is "0" when there is only one output pulse that is produced within the time interval following an original pulse $O_i$. When, however, two output pulses would be produced after the original pulse $O_i$ within this interval, the fact that storage ROS 3 is addressed by counter 2 causes a bit "1" to appear on line 15. Line 15 is one of the inputs to AND circuit 21 and is then the set input of flip-flop circuit 22 in logic unit 10. When the first output pulse that follows the original pulse $O_i$ is produced at the output of counter 13, it is transmitted, through line 16, to the second input of AND circuit 21, thereby setting flip-flop circuit 22. The set input of flip-flop 22, therefore, assumes level "1" and the modified addressing of the storage ROS on line 5 makes it possible to access a value M which would be utilized in the interval between the two output phases which are between the original pulses $O_i$ and $O_{i+1}$. Indeed, this value is the value of M which is utilized to obtain the first output pulse that follows the first original pulse $O_o$.

Another flip-flop circuit 23 of logic unit 10 is also utilized in the following way. The two flip-flop circuits 22 and 23 are reset upon each original pulse, by their reset inputs 8a or 8b, respectively. Since flip-flop 23 is reset, its output reset line 17 assumes a "high" level when the original pulse $O_i$ occurs. As line 17 is utilized as a "conditioning" input to counter 13, the latter, then, starts decrementing when any original pulse $O_i$ occurs. Should a single output pulse be produced within the interval which follows $O_i$, line 15 would produce a bit "0", as mentioned previously, and a bit "1" would be supplied at one input of AND circuit 24, through inverter 25. In that way, when the output pulse appears on line 16, the second input to AND circuit 24 assumes a "high" level, and flip-flop 23 is set. The reset output line 17, then, assumes a "low" level, and counter 13 stops operating until the next original pulse.

On the other hand, should two output pulses be produced within the interval which follows the original pulse $O_i$, line 15 would supply a "1". Therefore, a bit "0" is present at the input of AND circuit 24, and flip-flop 23 will not be set by the first output pulse on line 16 since AND circuit 24 is inhibited. Therefore, line 17 still assumes a "high" level when the first output pulse appears, and counter 13, then, is still "conditioned" to decrement. Its initial value is that which has been accumulated by counter 9 between the previous two original pulses. This value, which is in register 11, is transmitted to counter 13, through AND circuit 12 which is made conducting by the input line 18, in the following way. Input line 18 is the output of OR circuit 26 which has for inputs line 8c which transmits the original pulse, and line 16a which transmits the output pulse. Consequently, AND circuit 12 is conducting and the contents of register 11 are loaded in counter 13 when both original pulses and output pulses appear.

In the preceding description, there has been considered the case when $1 < n < N$. When $n \geq N$, a case which will rarely happen in the implementations of this invention, it suffices to programme storage ROS 3 a different way. When a time interval between two original pulses includes several output pulses, storage ROS 3 should be programmed so that when an original pulse appears, it causes a "1" to appear on line 15, which must remain until the last but one output pulse in the interval, so that the same value M is produced for each output pulse in the interval. To this end, storage ROS 3 is provided with a counter which is incremented upon each original pulse so that the value in this counter, when addressing storage ROS, can determine the occurence of the "1" on line 15 until the last but one output pulse.

Figure 2:
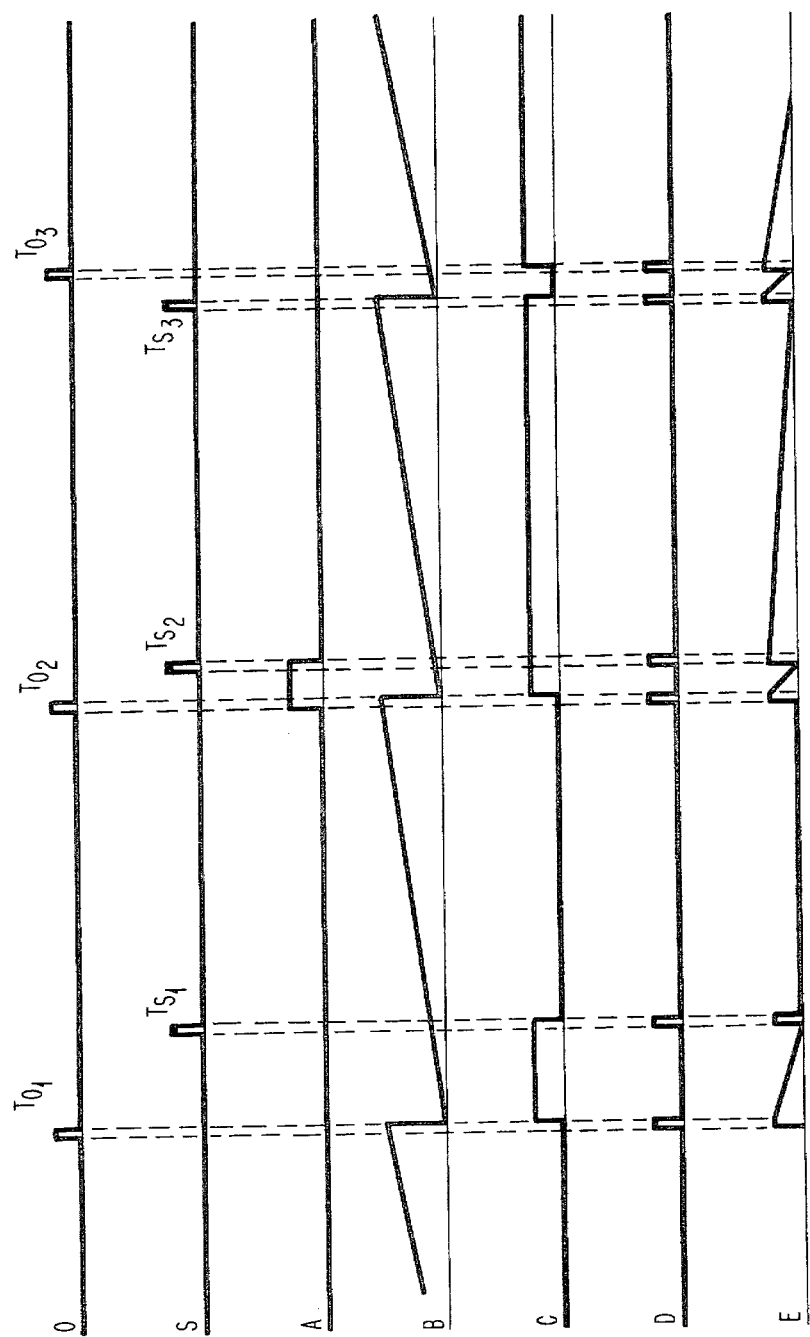
FIG. 2 is a time diagram depicting the operation of the device shown in FIG. 1.

FIG. 2 is a time diagram illustrating the levels of a number of significant points of FIG. 1, which are represented by the same letters on both figures.

In FIG. 2, three original pulses have been represented on line 0 at times $T_{O1}$, $T_{O2}$, $T_{O3}$, and three output pulses have been represented at times $T_{S1}$ between $T_{O1}$ and $T_{O2}$, and $T_{S2}$ and $T_{S3}$ between $T_{O2}$ and $T_{O3}$. For clarity purposes, only two output pulses have been represented in a time interval between two original pulses, but it is obvious that a larger number of pulses could have been chosen. It should be noted that the widths of the pulses, such as those represented in the figure, have been enlarged in order to make the drawing clearer; indeed, the pulse widths do not correspond to reality, the time length of the pulses being negligible with respect to the interval between two pulses. It should also be noted that the setting and resetting operations of the flip-flop circuits of FIG. 1 occur on the trailing edge of the control pulses. The output 15 is represented on line A, which assumes a "high" level only between an original pulse and the following output pulse (or else, the last but one output pulse) when two output pulses (or several ones) are produced within a time interval between two original pulses.

On line B, it can be seen that counter 9, which is reset by the trailing edge of each original pulse, is incremented from "0", whatever be the considered interval.

The output line 17 for resetting flip-flop 23, has been represented on line C. This line is used as a "conditioning" line for counter 13, and is normally "high" between the original pulse and the next following output pulse, but it remains "high" until the second output pulse in the case when there are two output pulses within the same interval.

Line D illustrates the state (either conducting or inhibited) of AND circuit 12. As a matter of fact, this line is the resultant of lines O or S.

Line E illustrates the state of counter 13. As shown in the figure, counter 13 is decremented only when its "conditioning" input (C) is "high", and is loaded only when AND circuit 12 is made conducting (D). Therefore, counter 13 is loaded on the leading edge of the original pulse and starts being decremented during the trailing edge, but this does not matter since the time length of the pulse is negligible with respect to the decrementation time. FIG. 2 shows that counter 13 is loaded for pulses $T_{S1}$ and $T_{S3}$. But this does not matter since, from the trailing edge of these output pulses, the "conditioning" output (C) is "low", thereby preventing counter 13 from decrementing.

Another embodiment consists in proceeding in two steps, in the case when $n \geq N$; in a first step, the rate of the pulses is multiplied in a frequency multiplier by an adequate factor x equal to a power of 2 so as to obtain an original pulse rate equal to xN which comes to the preceding case which consists in obtaining a pulse train $xN + n$ output pulses where $1 < n < xN$. For instance, if it is desirable to obtain $2N+1$ output pulses from the N original pulses, the pulse train is first caused to pass through a frequency doubler so as to obtain a train of $N' = 2N$ pulses, and then the device according to this invention is utilized to obtain a pulse train of $N' + 1 = 2N + 1$ regularly-spaced output pulses.

It is obvious that there exist other ways of implementing this invention when n≧N, without parting from the scope of this invention. Thus, for instance, logic unit 10 could be implemented in a different way and this implementation is quite easy for one skilled in the art as long as the output functions to be obtained and the inputs in hand, are known. Likewise, in the case when n=1, storage ROS 3 can be replaced by a mere counter since there is only one output pulse within each time interval between two original pulses.

In the preceding description, it has been assumed that a unique time interval T exists between any two consecutive original pulses. Indeed, this time T is not the same for each interval. That is why this invention makes it possible to synchronize the output pulses with the original pulse which immediately precedes them so as to get free of any possible variations in these time intervals. This is achieved because the value of counter 13 which is decremented so as to obtain the output pulse, is the value obtained upon incrementation of counter 9 within the time interval between the two original pulses.

Operation of the Invention

The device according to this invention can be implemented in the wire-type printers wherein the impact of the printing head upon the paper is controlled by regular pulses. Generally, the print density is 10 characters for each 25.4 mm. However, in some cases, it is useful to have a larger print density, such as 12 characters for each 25.4 mm. A pulse train therefore, must be generated so that the printing head control pulses be of a rate equal to 12/10 that of the original pulses. When applying the device according to this invention, one considers a number N=5 and n=1, making the first from the five original pulses coincident with the first from the six output pulses. The variable presettable counter (4, in FIG. 1) in that case, can be a four-input 16-capacity counter. If M is the value produced by the storage ROS, the counter has its inputs preset to value 16-M. The following table summarizes the input states of said counter for each of the output pulses.

|  | first input pulse | 2nd | 3rd | 4th | 5th | 6th |
|---|---|---|---|---|---|---|
| M counter inputs preset | coincident with the first original pulse | | 4 | 3 | | |
|  |  | 011 | 100 | 101 | 110 | 111 |

For instance, the third output pulse would normally occur a time $$\frac{2T}{?}$$

after the second original pulse (T being the time interval between 2 original pulses). Since the counter is preset to 1100 (M=4) it will assume states

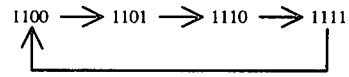

When it reaches state 1111, it produces a pulse and goes back to its preset value, the produced pulse being connected to its "load" input. Therefore, four counting pulses are necessary for the counter to produce a pulse. Consequently, assuming the counter would have been controlled at frequency F, the pulses it produced would be of a frequency equal to F/4.

It is obvious that this implementation has been given by way of an example, only, and there are many other possible implementations, such as, for instance, in any systems making use of a step-by-step motor.

While the invention has been particularly shown and described with reference to a preferred embodiment thereof, it will be understood by those skilled in the art that numerous changes in form and detail may be made therein without departing from the spirit and scope of the invention.

What is claimed is:

1. A device for obtaining N+n output pulses from N original pulses including:
   a count-up counter which is reset upon each original pulse in order to be incremented at a first predetermined frequency until the following original pulse,
   a count-down counter loaded with the contents of said count-up counter when said original pulse appears in order to be decremented at a second predetermined frequency until it reaches value 0,
   a variable presettable counter supplying said second predetermined frequency to said count-down counter so that the latter is decremented when each original pulse appears or when output pulses appear with the exception of the last pulse in the interval when the time interval between said original pulses includes several output pulses, and
   a control unit for controlling said variable counter in response to the original pulses so that said count-down counter supplies the output pulses each time it reaches value 0.

2. A device according to claim 1, wherein said control unit is a read-only storage (ROS) which supplies control words to said variable counter in response to the original pulses.

3. A device according to claim 2, wherein addressing said read only storage is carried out by the contents of a counter which is incremented each time an original pulse appears.

4. A device according to claim 2 or claim 3, characterized in that:
   the first predetermined frequency at which said count-up counter is incremented, being equal to $$\frac{F}{N+n},$$

F being the main frequency of the system,
   the second predetermined frequency supplied by said variable counter and at which said count-down counter is decremented, being equal to F/M,
   the control words supplied to said variable counter by said control memory being values M which are dependent on the output pulses to be obtained.

5. A device according to claim 4, wherein, when n is greater than N, further including a frequency multiplier positioned at the input of the device so as to be brought back to the case when n is less than N.

* * * * *

UNITED STATES PATENT AND TRADEMARK OFFICE
CERTIFICATE OF CORRECTION

PATENT NO. : 4,251,722
DATED : February 17, 1981
INVENTOR(S) : Remi Vautier

It is certified that error appears in the above-identified patent and that said Letters Patent are hereby corrected as shown below:

Insert in the heading the following information for Item [30] --Foreign Application Priority Data, March 1, 1979 [FR] France 78 28295--.

Signed and Sealed this

Fourteenth Day of July 1981

[SEAL]

Attest:

Attesting Officer

GERALD J. MOSSINGHOFF

Commissioner of Patents and Trademarks